(12) United States Patent
Flynn (10) Patent No.: US 7,353,667 B2
(45) Date of Patent: Apr. 8, 2008

(54) NECK RING GUIDE FOR GLASSWARE MAKING MACHINE

(75) Inventor: Robin L. Flynn, Waterville, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 510 days.

(21) Appl. No.: 11/028,913

(22) Filed: Jan. 3, 2005

(65) Prior Publication Data

US 2006/0144092 A1 Jul. 6, 2006

(51) Int. Cl.
*C03B 9/00* (2006.01)

(52) U.S. Cl. ............... 65/235; 65/227; 65/229; 65/224; 65/237

(58) Field of Classification Search .......... 65/215–225, 65/79, 229, 235, 237, 239
See application file for complete search history.

(56) References Cited

U.S. PATENT DOCUMENTS

| | | |
|---|---|---|
| 1,885,409 A | 3/1928 | Bragg |
| 3,244,499 A | 8/1962 | Wiley |
| 3,785,795 A | 1/1974 | Colchagoff |
| 3,934,998 A * | 1/1976 | Rowe ................. 65/172 |
| 4,222,762 A | 9/1980 | Braithwaite |
| 4,273,569 A | 6/1981 | Staley |
| 4,436,543 A | 3/1984 | Kasten |
| 4,662,928 A | 5/1987 | Dauer |
| 5,609,664 A | 3/1997 | Olson |
| 5,725,629 A | 3/1998 | Olson |

FOREIGN PATENT DOCUMENTS

| | | |
|---|---|---|
| EP | 0043033 A1 | 1/1982 |
| EP | 0915063 A2 | 5/1999 |

* cited by examiner

*Primary Examiner*—Eric Hug
*Assistant Examiner*—DeMaris R. Wilson (57) ABSTRACT

A neck ring guide for aligning neck ring sections in a glassware forming machine has a center body and a pair of spaced parallel runners coupled to the center body for receipt in guide slots in the neck ring sections. Keepers on the outboard sides of the runners retain the runners in the guide slots. Instead of keepers, the runners may be retained in the guide slots by roll pins on the neck ring sections engaged in retainer slots in the runners.

18 Claims, 9 Drawing Sheets

NECK RING GUIDE FOR GLASSWARE MAKING MACHINE

This invention relates to apparatus for making glass containers, having opposed neck ring sections to form the finish portion of a glass container and a neck ring guide for guiding the opening and closing of the neck ring sections.

BACKGROUND AND SUMMARY OF THE INVENTION

Glassware making machines typically employ invert arms for transferring the neck ring sections between a blank station to a blow station, and a neck ring guide to keep the opposed neck ring sections aligned during their opening and closing movements.

A neck ring guide in current use has a circular flange that engages an internal circular groove in each of the neck ring sections. However, when the neck ring sections open far enough to clear the parison finish and permit it to be removed, the neck ring sections become partially disengaged from the neck ring guide. This partial disengagement can allow the neck ring sections to be thrown out of position by the forces produced when the invert arms transfer the neck ring sections back to the blank side of the machine. Also, upon subsequent closing of the neck ring sections, there is excessive friction between the neck ring sections and the neck ring guide.

In accordance with the present invention, the neck ring guide has a pair of parallel runners slidably disposed in external slots formed in the opposed neck ring sections. The runners may be either integrally formed with or replacably mounted on a center body of the neck ring guide. The runners may have outboard keepers for retaining the runners in the neck ring slots, which may be formed integrally with or replacably mounted on the runners. The runners more preferably have longitudinal slots for receiving roll pins on the neck ring sections to retain the runners in the neck ring slots.

The outboard runner design provides wide stable engagement with the neck ring sections, so that the neck ring sections are closely guided at all times during opening and closing movement. Being formed in the outer sides of the neck ring sections, the slots are conveniently located for surface coating options and for machining purposes.

One object of this invention is to provide a glassware making machine provided with neck ring sections and a neck ring guide, having one or more of the foregoing features and capabilities.

BRIEF DESCRIPTION OF THE DRAWINGS

Other objects, features and advantages of the invention will become more apparent from the following detailed description and accompanying drawings, wherein.

DETAILED DESCRIPTION OF THE PREFERRED EMBODIMENT

Referring now more particularly to the drawings, and especially to FIGS. 1-8, there is shown a pair of parallel invert arm sections 20 and 22 which are adapted to swing in unison from a blank station, where the neck portion of a glass parison is formed, to a blow station for the final forming step. The invert arm sections 20 and 22 carry two neck ring assemblies 24 and 26, which are identical in construction. Each neck ring assembly forms the finish portion of a parison to final shape.

Figure 1:
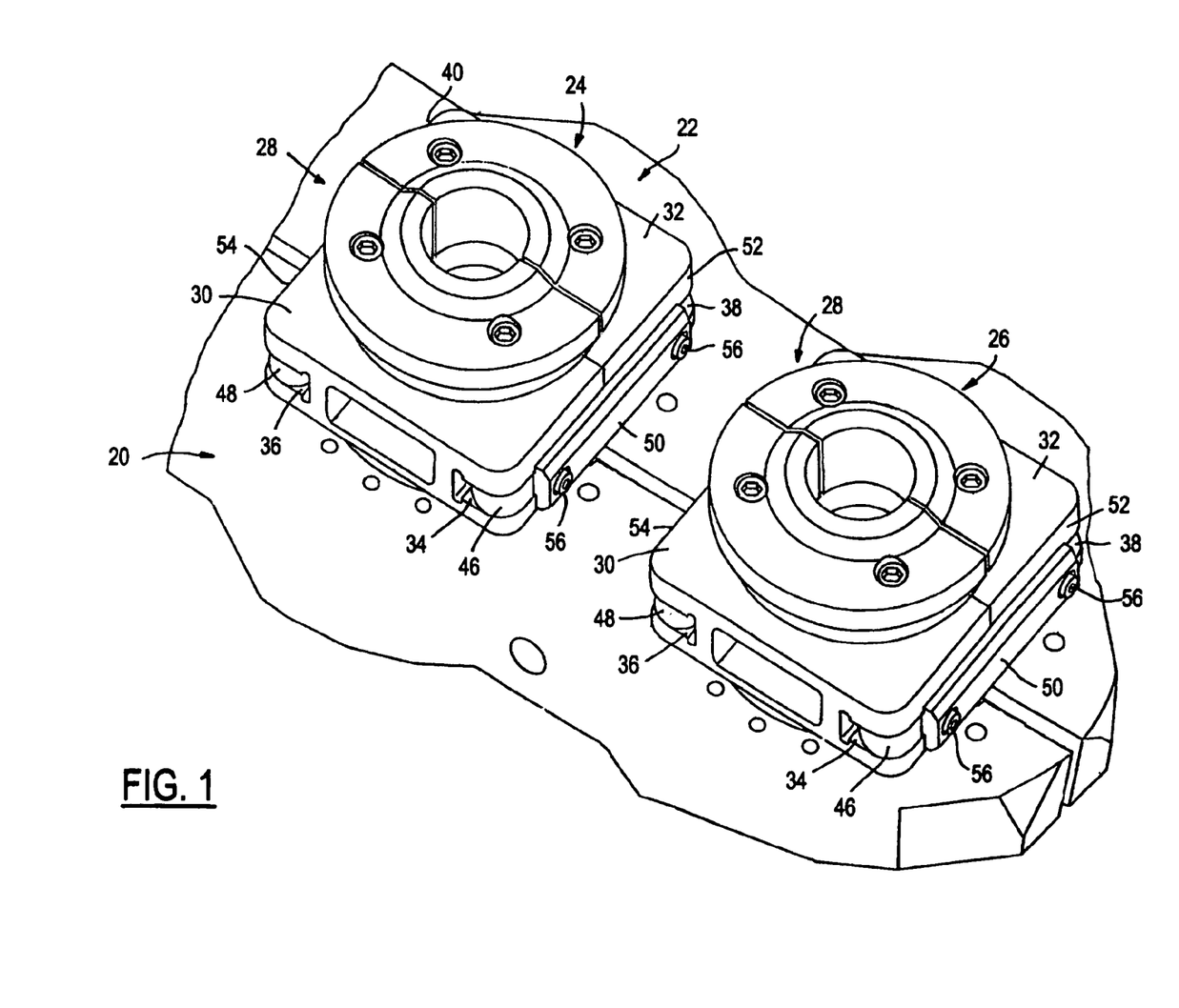
FIG. 1 is a fragmentary perspective view showing the invert arms of a glassware forming machine provided with two neck ring assemblies for forming the finish portions of two glass containers.
Figure 2:
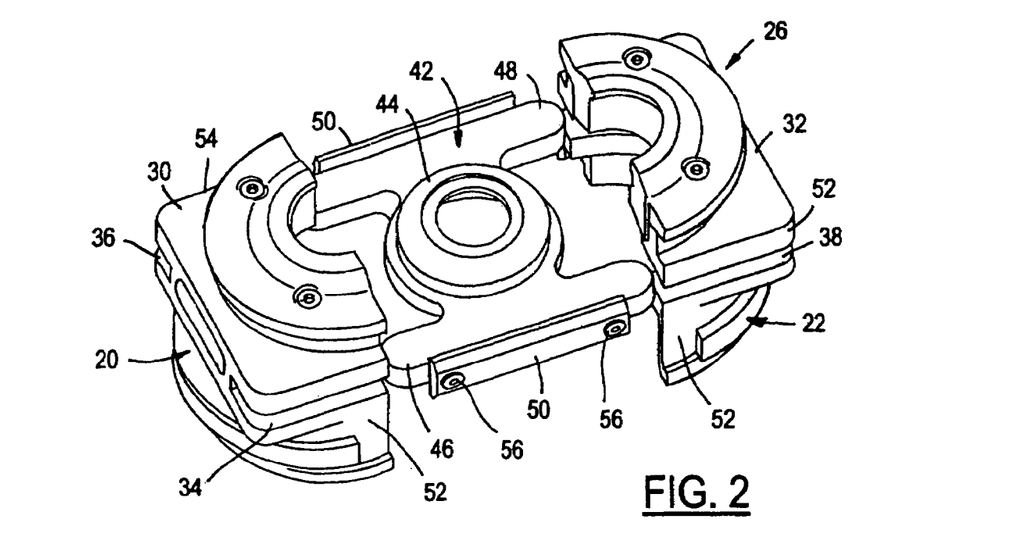
FIG. 2 is an exploded perspective view of one of the neck ring assemblies in FIG. 1, showing the neck ring sections separated from the neck ring guide.
Figure 3:
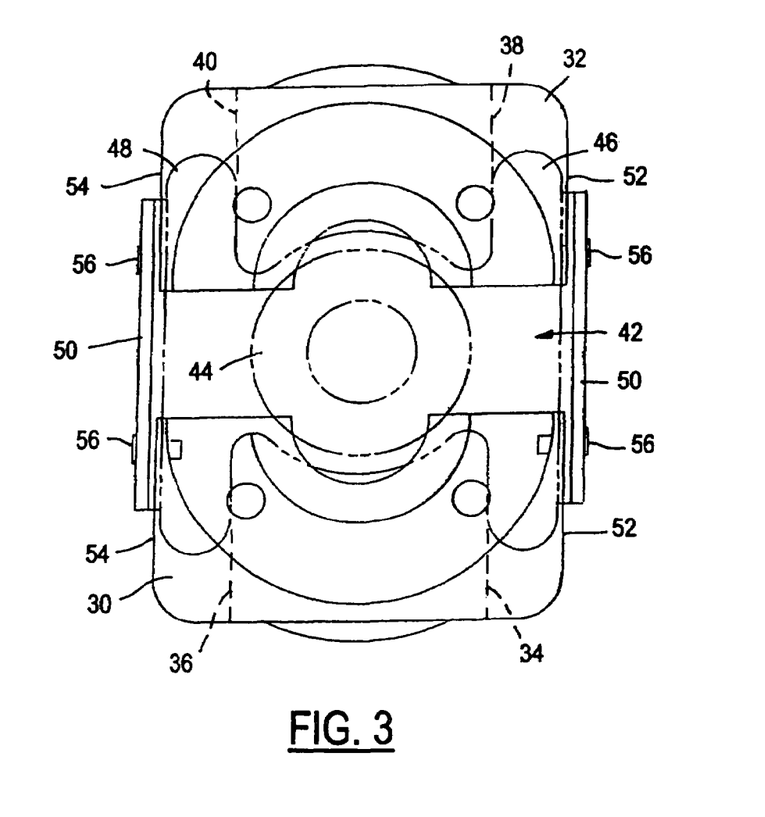
FIG. 3 is a top plan view of the neck ring assembly shown in FIG. 2, with the neck ring sections open.

Each neck ring assembly 24, 26 has a generally circular neck ring 28 composed of two neck ring sections 30 and 32. The neck ring section 30 is secured to the invert arm section 20 and the neck ring section 32 is secured to the invert arm section 22.

The neck ring sections 30 and 32 of each neck ring assembly are generally arcuate and opposed to one another. When the invert arm sections 20 and 22 are moved toward one another, the neck ring sections 30 and 32 close as in FIG. 1 to form a ring in which the parison finish is formed to final shape. When the invert arm sections 20 and 22 are moved away from one another, the neck ring sections 30 and 32 open as in FIG. 3 to permit the parison to be removed.

Figure 6:
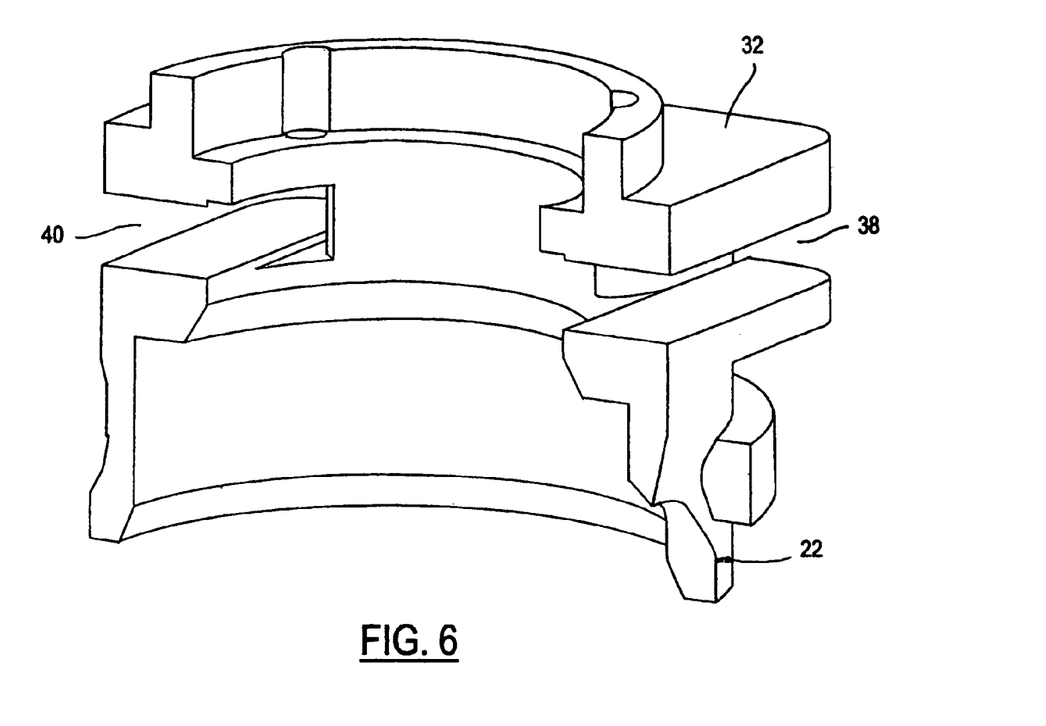
FIG. 6 is a perspective view of one of the neck ring sections.
Figure 7:
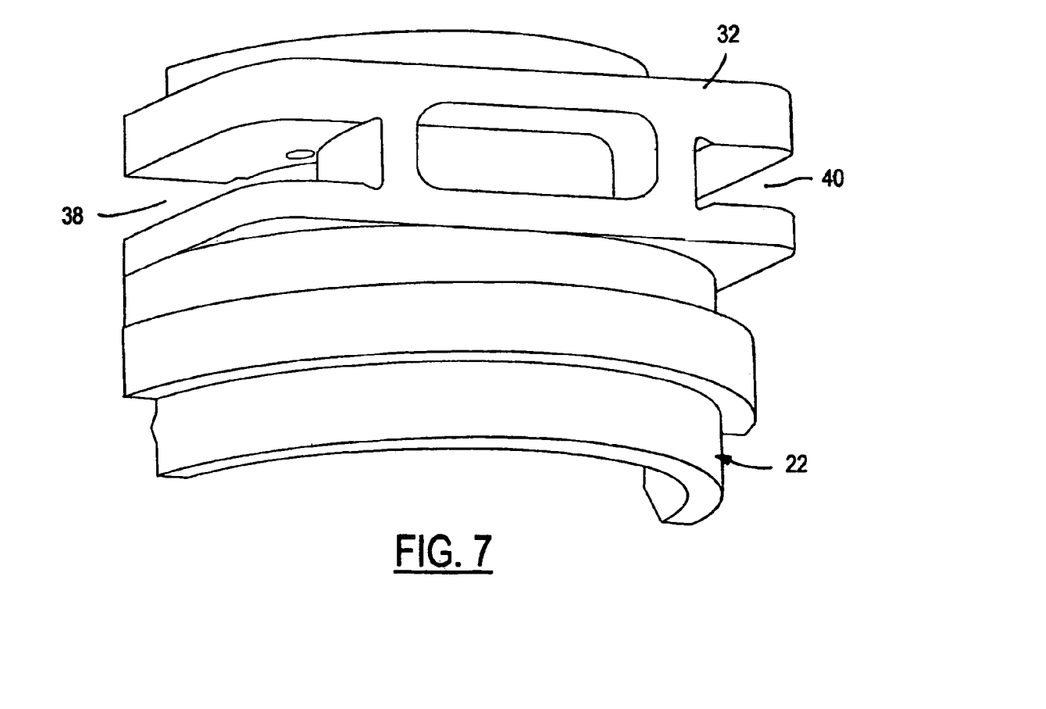
FIG. 7 is a perspective view of the neck ring section shown in FIG. 6, as seen from a different angle.

The neck ring section 30 of each neck ring assembly 24, 26 has external parallel slots 34 and 36 on opposite sides, and the neck ring section 32 has external parallel slots 38 and 40 on opposite sides, with the guide slots 34 and 38 in alignment and the slots 36 and 40 in alignment.

Figure 5:
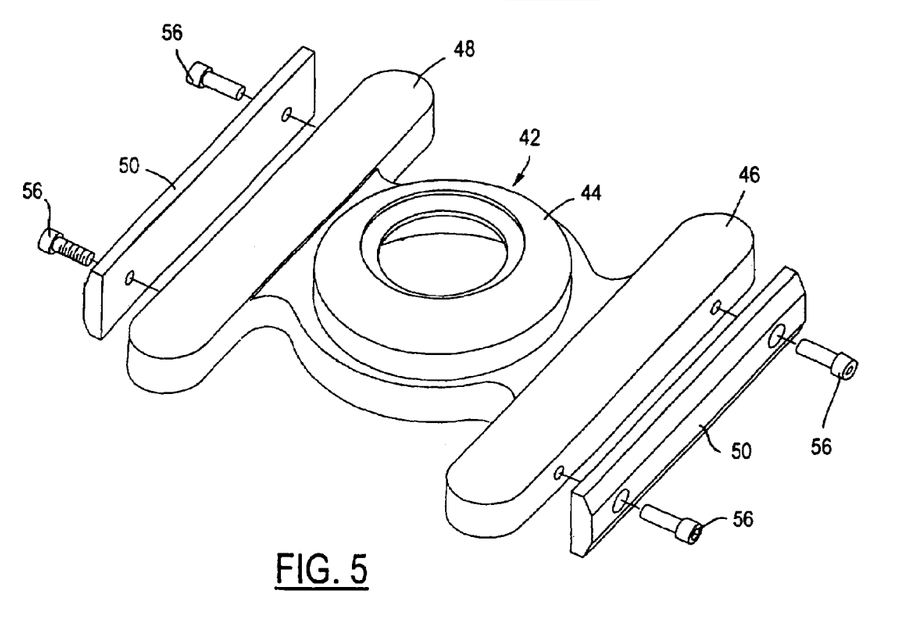
FIG. 5 is an exploded view in perspective of the neck ring guide shown in the preceding figures, with keepers for retaining the runners in the neck ring slots shown detached from the runners.

Each neck ring assembly 30, 32 includes a neck ring guide 42. The neck ring guide 42 has a center body 44 and a pair of outboard parallel runners 46 and 48 on opposite sides of the center body. The runner 46 is slidably received in the aligned guide slots 34 and 38 of the neck ring sections 30 and 32 and the runner 48 is slidably received in the aligned guide slots 36 and 40 of the neck ring sections. The runners may be integral with the center body as shown, or may be formed separately from the center body. The runners, especially if formed separately from the center body, may be made of a hardened material and finish ground to improve surface finish and lower friction. When the neck ring sections 30 and 32 open and close, such opening and closing movements are guided by the runners 46 and 48.

Figure 4:
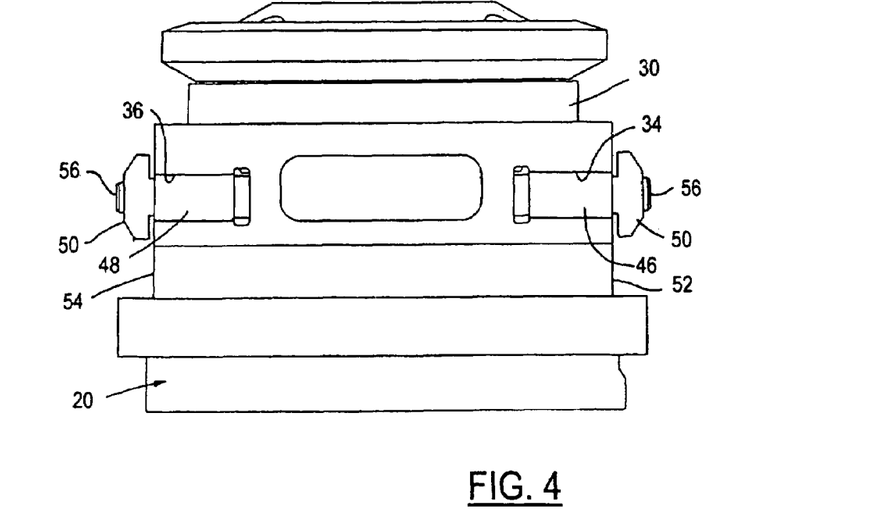
FIG. 4 is a front elevational view of the neck ring assembly shown in FIG. 3.

Keepers 50 in the form of elongated bars extend along the length of the runners on the outboard sides thereof. The keepers retain the runners 46 and 48 in the guide slots of the neck ring sections. The keepers 50 run along the sides 52 and 54 of the neck ring sections 30 and 32. Preferably, there is a slight clearance between the keepers 50 and the sides 52 and 54 of the neck ring sections as shown in FIG. 4 to allow the ring guide 42 to float slightly when the neck ring sections 30 and 32 are moved away from one another to the open position. The keepers are removably secured to the runners by fasteners 56 but may, if desired, be formed integrally with the runners.

When the neck ring sections open and close, the keepers contain side-to-side movement of the neck ring sections and the outboard runner design keeps the neck ring sections from rotating.

Figure 8:
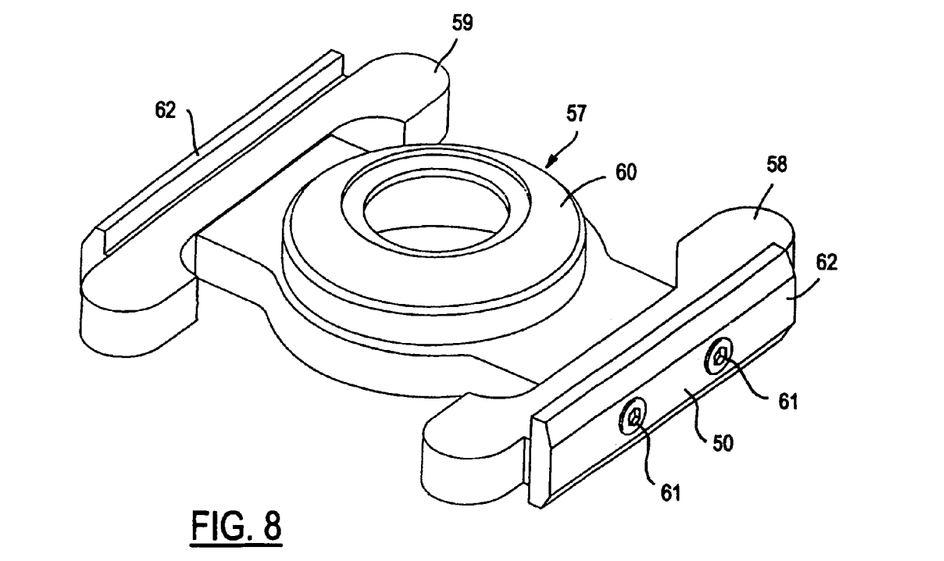
FIG. 8 is a perspective view of a modified neck ring guide, in which the runners are bolted to the center body of the neck ring guide and a keeper is formed integrally with each runner.

FIG. 8 shows a modified neck ring guide 57 in which parallel runners 58 and 59 are formed separately from and secured to opposite sides of a center body 60 by fasteners 61. A keeper 62 is formed integrally with each runner. Each runner and keeper combination constitutes a hardened reusable piece that may be bolted to a replaceable center body. The neck ring guide 57 may be substituted for the neck ring guide 42 in the embodiment of FIGS. 1-7.

Figure 9:
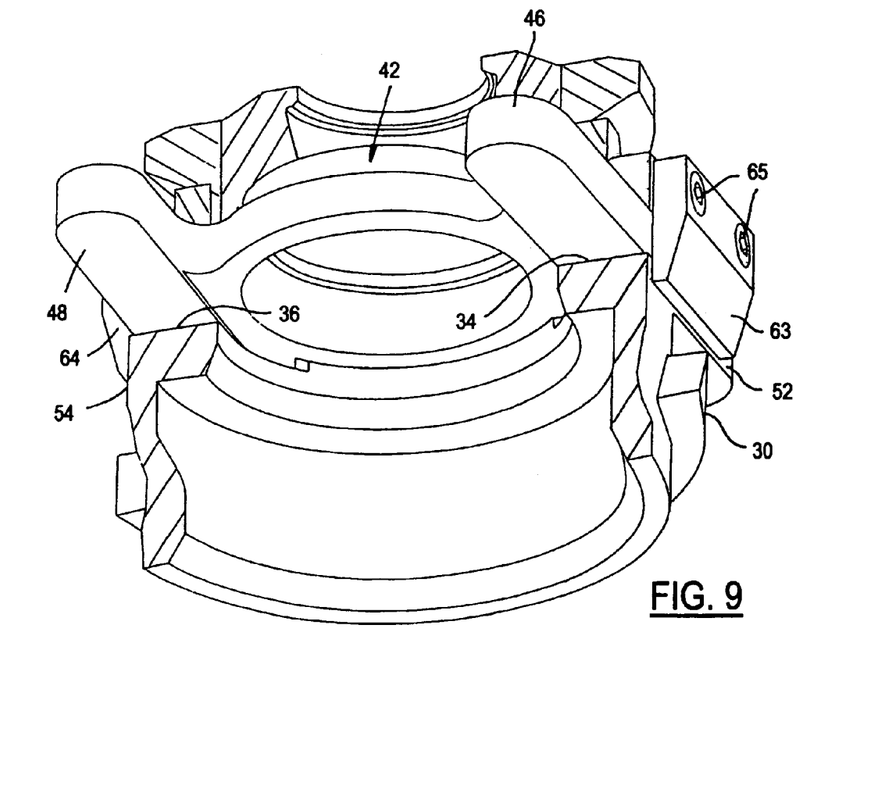
FIG. 9 is a perspective view showing portions of a neck ring section and the neck ring guide, in which the keepers are attached to the neck ring section instead of to the runners.
Figure 10:
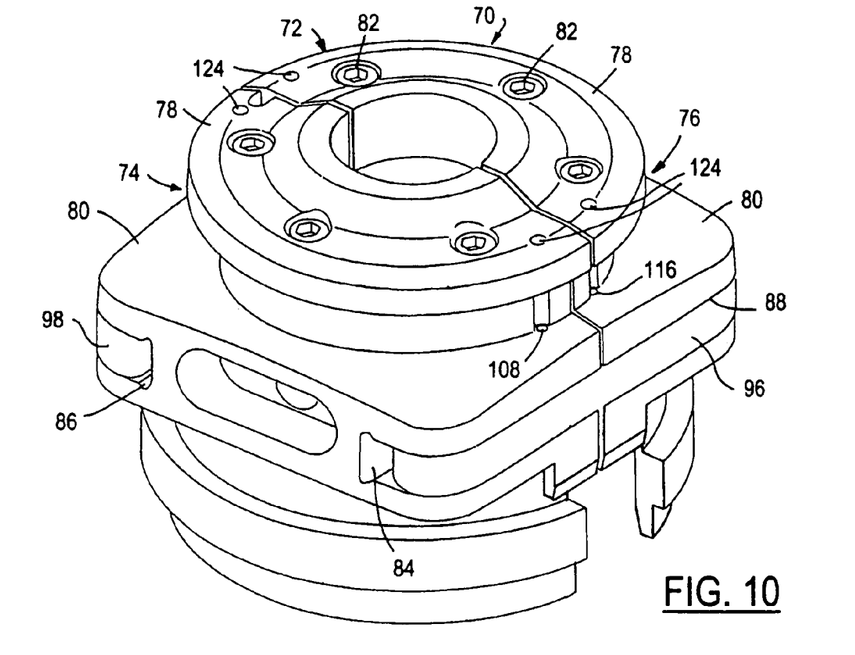
FIG. 10 is a perspective view of a modification in which roll pins, instead of keepers, are provided to retain the runners in the neck ring slots.

FIG. 9 shows a modification of the invention in which the neck ring assembly is the same as previously described, except that the keepers for retaining the runners in the slots of the neck ring sections are secured to the neck ring sections rather than to the runners of the neck ring guide. FIG. 9 shows a keeper 63 secured to one side 52 of the neck ring section 30 to retain the runner 46 in the guide slot 34, and a keeper 64 secured to the opposite side 54 of the neck ring section 30 to retain the runner 48 in the guide slot 36. The keepers 63 and 64 may be formed integrally with the neck ring section or they may be replaceably mounted thereon by fasteners 65 as shown. Preferably, there is a slight clearance between the keepers 63 and 64 and the sides of the guide ring 42 to allow it to float slightly when the neck ring sections open and close. It will be understood that keepers, similar to the keepers 63 and 64, will also be secured to the neck ring section 32 in the same manner and for the same purpose.

Referring now to FIGS. 10-13, a further modification of the invention is shown in which invert arm sections (not shown) carry a neck ring assembly 70. The neck ring assembly 70 has a generally circular neck ring 72 composed of two neck ring sections 74 and 76. The neck ring section 74 is secured to one of the invert arm sections (not shown) and the neck ring section 76 is secured to the other of the invert arm sections (not shown). Each of the neck ring sections has a top portion 78 secured to a base portion 80 by fasteners 82.

As in the first embodiment, the neck ring sections 74 and 76 are generally arcuate and opposed to one another. When the invert arms 66 and 68 are moved toward one another as in FIG. 10, the neck ring sections 74 and 76 close to form a ring in which the parison finish is formed to final shape. When the invert arms are moved away from one another as in FIG. 11, the neck ring sections 74 and 76 open to permit the parison to be removed.

Figure 12:
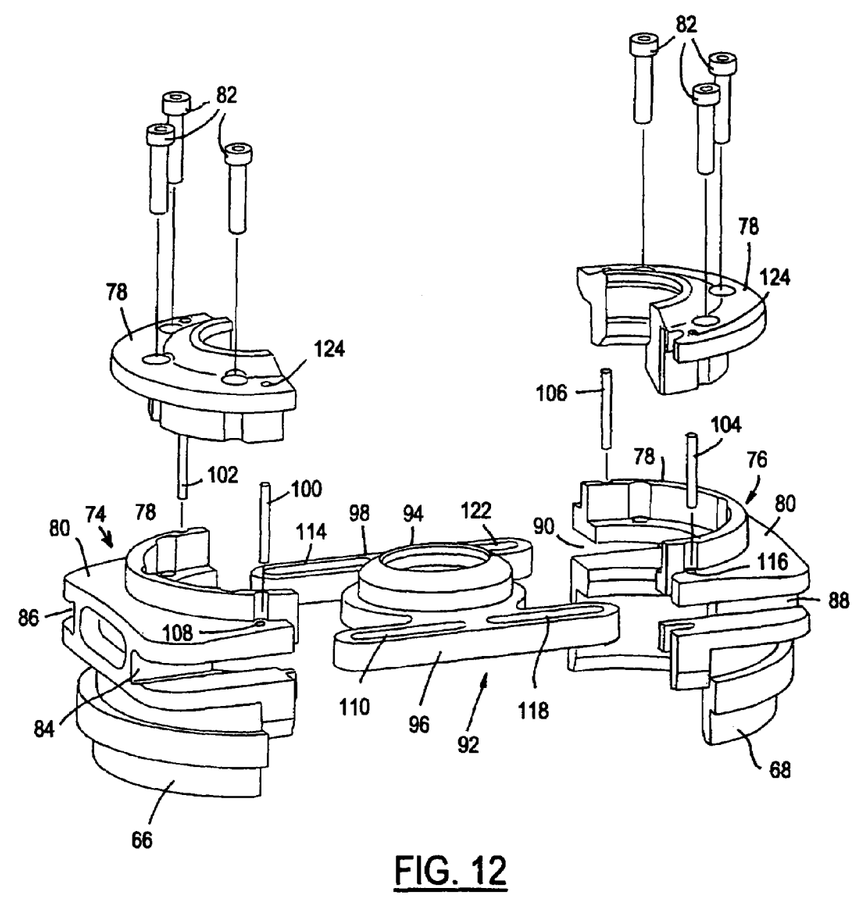
FIG. 12 is an exploded perspective view of the neck ring sections, neck ring guide and roll pins of the modification of FIGS. 10 and 11.

The base portion 80 of the neck ring section 74 has external parallel guide slots 84 and 86 on opposite sides, and the base portion 80 of the neck ring section 76 has external parallel guide slots 88 and 90 on opposite sides, with the slots 84 and 88 in alignment and the slots 86 and 90 in alignment.

The neck ring assembly 70 includes a neck ring guide 92. The neck ring guide has a center body 94 and a pair of outboard parallel runners 96 and 98 on opposite sides of the center body. The runner 96 is slidably received in the aligned guide slots 84 and 88 of the neck ring sections 74 and 76 and the runner 98 is slidably received in the aligned guide slots 86 and 90 of the neck ring sections to guide the opening and closing movements of the neck ring sections.

To retain the runners in the guide slots of the neck ring sections 74 and 76, retainer elements in the form of roll pins 100, 102, 104 and 106 are provided. The roll pin 100 is disposed in a hole 108 in the neck ring section 74 and extends into a retainer slot 110 in the runner 96. The roll pin 102 is disposed in a hole (not shown) in the neck ring section 74 and extends into a retainer slot 114 in the runner 98. The roll pin 104 is disposed in a hole 116 in the neck ring section 76 and extends into a retainer slot 118 in the runner 96. The roll pin 106 is disposed in a hole (not shown) in the neck ring section 76 and extends into a retainer slot 122 in the runner 98. The slots 110 and 118 in the runner 96 are elongated and aligned with one another. The slots 114 and 122 in the runner 98 are elongated and aligned with one another. Preferably, there is a slight clearance between the roll pins and the side walls of the slots into which they extend to allow the neck ring guide to float slightly when the neck ring sections open and close. To install the roll pins 100, 102, 104 and 106 in the holes in the neck ring sections, the roll pins may be inserted through passages 124 in the top portions 78 of the neck ring sections.

When the neck ring sections 74 and 76 open and close, such opening and closing movements are guided by the runners 96 and 98. The runners are retained in the guide slots 84, 88, 86 and 90 of the neck ring sections 74 and 76 by the roll pins 100, 102, 104 and 106.

Figure 11:
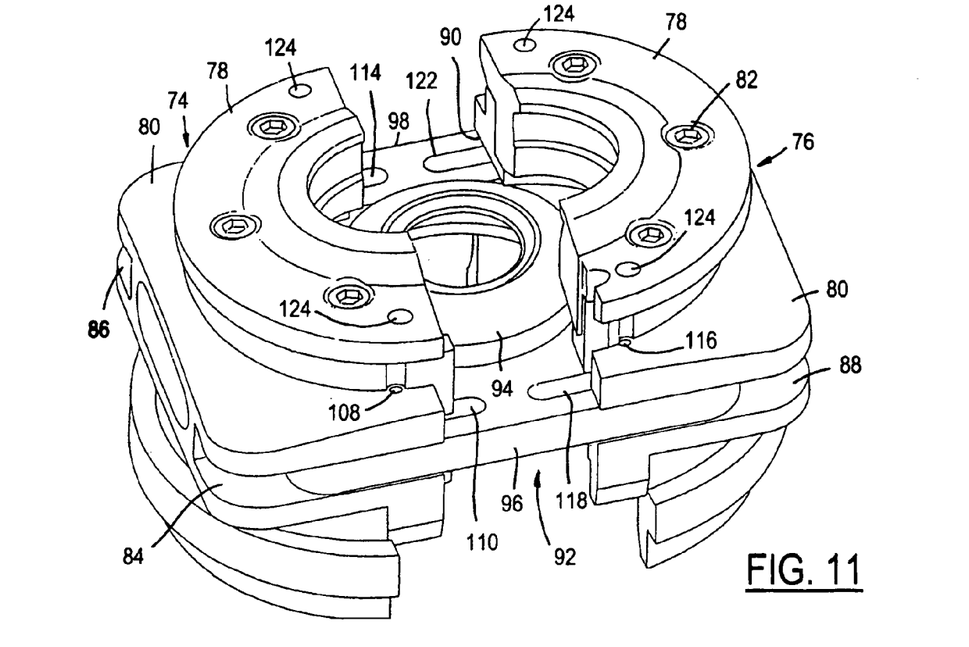
FIG. 11 is a perspective view similar to FIG. 10, but showing the neck ring sections in an open position.
Figure 13:
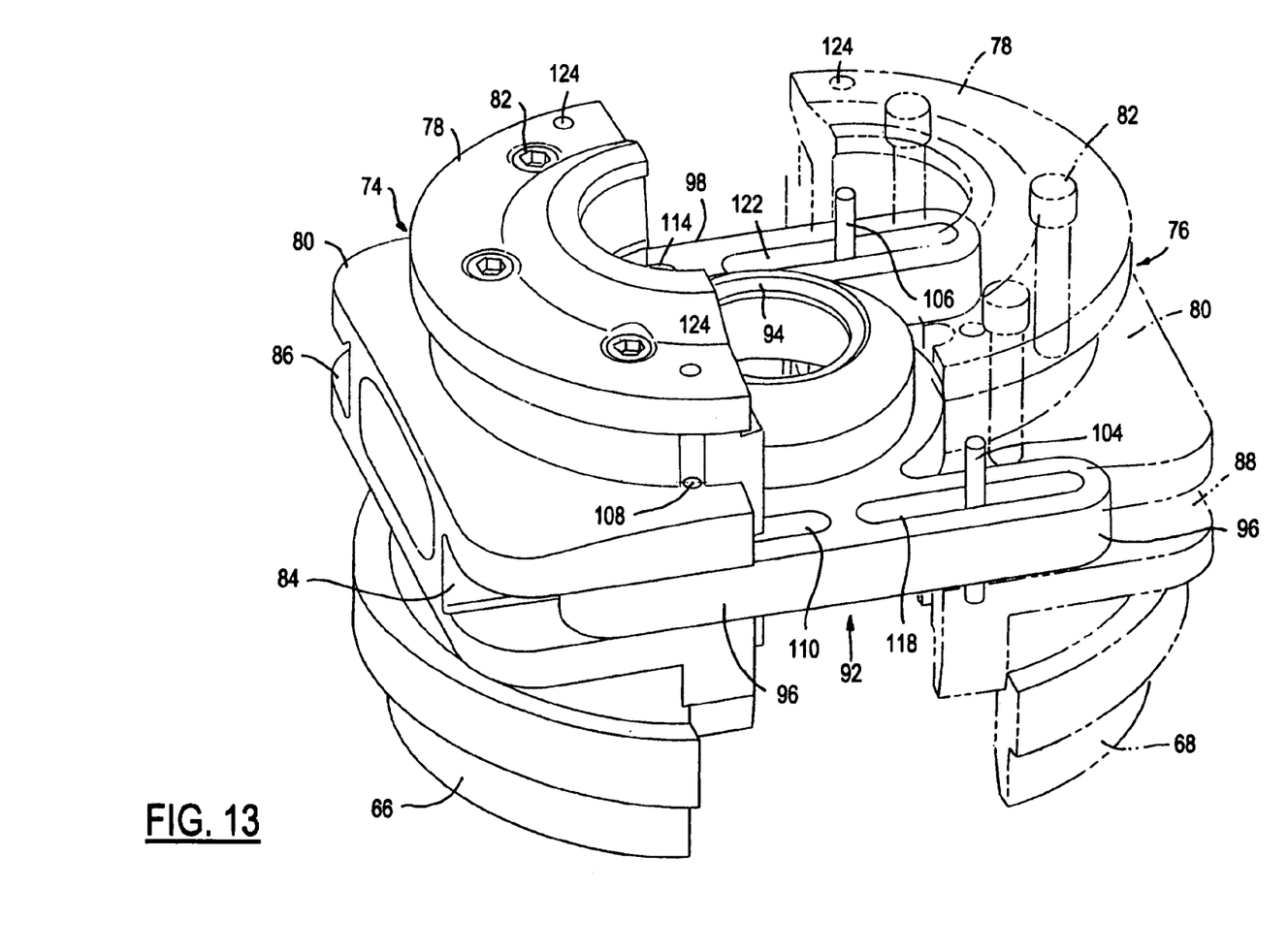
FIG. 13 is a perspective view of the modification of FIG. 10, with parts in broken lines and the neck ring sections in open position.
Figure 14:
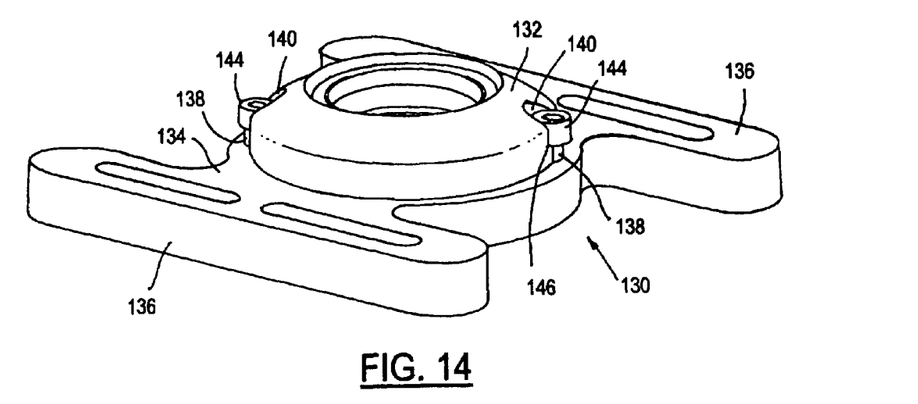
FIG. 14 is a perspective view of a neck ring guide of modified construction.
Figure 15:
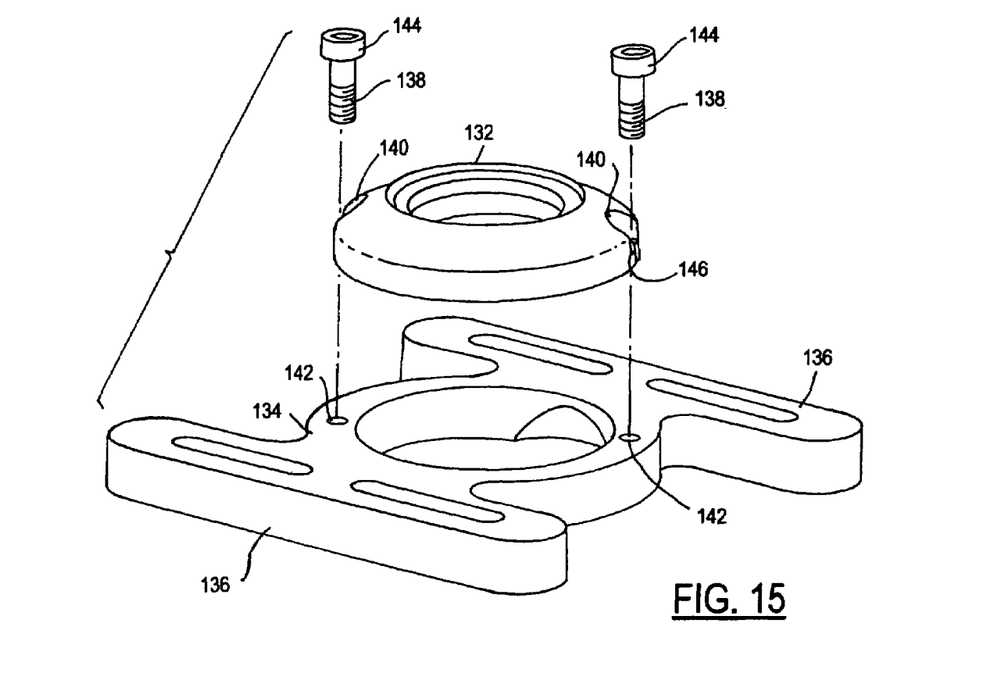
FIG. 15 is an exploded perspective view of the neck ring guide in FIG. 14.

FIGS. 14 and 15 show a neck ring guide 130 which is a modification of the neck ring guide 92 in FIGS. 11-13. The neck ring guide 130 has a replaceable cavity hub 132 and a separate reusable guide plate 134 on which integral runners 136 are formed. The guide plate 134 is replaceably secured to the hub 132 by removable fasteners in the form of bolts 138 which extend through slots 140 in the hub and thread into holes 142 in the guide plate. The bolts 138 have heads 144 which clamp down on shoulders 146 in the slots 140 to secure the hub 132 and guide plate 134 together. This two-piece construction permits the guide plate 134 to be separately formed from a hardened material and finish ground to improve surface finish and lower friction, thereby extending the life of the guide plate. The separately formed hub can be replaced when necessary or desired.

This disclosure herein is intended to be exemplary, and not limiting. The scope of the invention is defined by the claims appended hereto.

The invention claimed is:

1. A neck ring guide for aligning neck ring sections in a glassware forming machine, said neck ring guide including a one-piece annular center body and a pair of spaced parallel runners attached to said center body for receipt in guide slots of the neck ring sections, said runners being of barlike construction and either of one piece construction with said center body or replaceably mounted to said center body.

2. The neck ring guide set forth in claim 1 including keepers on outboard sides of said runners for retaining said runners in the guide slots of the neck ring sections.

3. The neck ring guide set forth in claim 2 wherein said keepers are formed integrally with said runners.

4. The neck ring guide set forth in claim 2 wherein said keepers are replaceably mounted on said runners.

5. The neck ring guide set forth in claim 1 wherein each of said runners has at least one longitudinally extending slot for receiving a retainer element on one of the neck ring sections.

6. The neck ring guide set forth in claim 1 wherein each of said runners has a first longitudinally extending slot for receiving a first retainer element on one of the neck ring sections and a second longitudinally extending slot for receiving a second retainer element on the other of the neck ring sections.

7. A neck ring assembly for a glassware forming machine, which includes:
  a neck ring having opposed neck ring sections movable toward and away from one another,
  each of said neck ring sections having spaced, parallel guide slots on outer peripheral surface portions of opposite sides thereof, and
  a neck ring guide for aligning the neck ring sections and for guiding the movement of said neck ring sections toward and away from one another,
  said neck guide having a center body and a pair of spaced parallel outboard runners on an outer periphery of said center body, said runners being of barlike construction and either of one piece construction with said center body or replaceably mounted to said center body,
  one of said runners slidably engaging the guide slots on one side of said neck ring sections and the other of said runners slidably engaging the guide slots on the other side of said neck ring sections.

8. The neck ring assembly set forth in claim 7 including keepers on outboard sides of said runners for retaining said runners in the guide slots of the neck ring sections.

9. The neck ring assembly set forth in claim 8 wherein said keepers are formed integrally with said runners.

10. The neck ring assembly set forth in claim 8 wherein said keepers are replaceably mounted on said runners.

11. The neck ring assembly set forth in claim 7 wherein one of said neck ring sections has a pair of first retainer elements respectively engageable in first longitudinally extending retainer slots in said runners, and the other of said neck ring sections has a pair of second retainer elements respectively engageable in second longitudinally extending retainer slots in said runners, said retainer elements and retainer slots retaining said runners in said guide slots.

12. The neck ring assembly set forth in claim 11 wherein said retainer elements comprise roll pins.

13. The neck ring assembly set forth in claim 12 wherein the retainer slots in each of the runners are aligned with one another.

14. The neck ring assembly set forth in claim 13 wherein said runners are formed integrally with said center body.

15. The neck ring assembly set forth in claim 13 wherein said runners are replaceably mounted to said center body.

16. A neck ring guide for aligning neck ring sections in a glassware forming machine, said neck ring guide including a hub and a separate reusable guide plate replaceably mounted on said hub, said guide plate having spaced parallel runners for receipt of guide slots in the neck ring sections, said runners being of barlike construction and either of one piece construction with said center body or replaceably mounted to said center body.

17. The neck ring guide set forth in claim 16 wherein said guide plate is replaceably mounted on said hub by removable fasteners.

18. The neck ring guide set forth in claim 17, wherein said runners are integrally formed with said guide plate.

* * * * *